US012682443B2

(12) United States Patent
Zhang et al.

(10) Patent No.: US 12,682,443 B2
(45) Date of Patent: Jul. 14, 2026

(54) INSPECTION METHODS FOR SMALL BORE PIPES

(71) Applicants:Dayi Zhang, Glasgow (GB); Gordon Ian Dobie, Dumfries (GB); Graeme Michael West, Glasgow (GB); Colin Forrester, Aberdeenshire (GB)

(72) Inventors: Dayi Zhang, Glasgow (GB); Gordon Ian Dobie, Dumfries (GB); Graeme Michael West, Glasgow (GB); Colin Forrester, Aberdeenshire (GB)

( * ) Notice: Subject to any disclaimer, the term of this patent is extended or adjusted under 35 U.S.C. 154(b) by 392 days.

(21) Appl. No.: 18/233,761

(22) Filed: Aug. 14, 2023

(65) Prior Publication Data

US 2023/0386011 A1     Nov. 30, 2023

(51) Int. Cl.
*G06T 7/00* (2017.01)
*G06T 7/73* (2017.01)

(52) U.S. Cl.
CPC .............. *G06T 7/0004* (2013.01); *G06T 7/73* (2017.01); *G06T 2207/10028* (2013.01)

(58) Field of Classification Search
None
See application file for complete search history.

(56) References Cited

U.S. PATENT DOCUMENTS 4,964,059 A    10/1990  Sugaya
7,460,980 B2   12/2008  Hinn 8,395,661 B1    3/2013  Olsson
8,547,428 B1   10/2013  Olsson
9,378,431 B2    6/2016  Stoeffler
9,444,981 B2    9/2016  Bellis
10,163,213 B2  12/2018  Boyle
10,198,872 B2   2/2019  Lurie
10,434,547 B2  10/2019  Turner
10,440,332 B2  10/2019  Olsson
(Continued)

OTHER PUBLICATIONS

Hosseinzadeh, Salaheddin, et al. "A novel centralization method for pipe image stitching." IEEE Sensors Journal 21.10 (2020): 11889-11898. (Year: 2020).*
(Continued)

*Primary Examiner* — Sean M Conner
(74) *Attorney, Agent, or Firm* — Boris Leschinsky

(57) ABSTRACT
A novel video inspection method for an interior surface of a small diameter pipe may include the steps of advancing a videoscope through the pipe of known size while acquiring raw images therefrom; estimating the video camera pose for at least some of the raw images; sequentially building a pipe point cloud, a mesh, and a 3D textured model of the interior surface of the pipe from the raw images with adjustments for video camera poses; unwrapping the raw images using camera poses and the pipe point cloud to create unwrapped images of the interior surface of the pipe; and creating a panoramic image of the interior surface of the pipe by stitching the unwrapped images together. The method improves on a conventional Structure-from-Motion technique and allows enhanced sharpness, reduced artifacts, and improved uniformity of lighting as a result of reduced model noise and removal of outliers. The method may be implemented with conventional video borescopes by postprocessing raw images using proprietary software.

4 Claims, 11 Drawing Sheets

(56)                References Cited

U.S. PATENT DOCUMENTS

| | | | |
|---|---|---|---|
| 10,502,712 | B2 | 12/2019 | Hall |
| 10,682,108 | B1 | 6/2020 | Ma |
| 2010/0211354 | A1 | 8/2010 | Park |
| 2011/0175996 | A1 | 7/2011 | Penza |
| 2014/0022374 | A1 | 1/2014 | Brignac |
| 2014/0063229 | A1 | 3/2014 | Olsson |
| 2016/0138914 | A1* | 5/2016 | Chang ................... G06T 7/0004 |
| | | | 702/167 |
| 2020/0020075 | A1* | 1/2020 | Khwaja ..................... G06T 5/70 |
| 2020/0162702 | A1 | 5/2020 | Olsson |
| 2022/0051431 | A1* | 2/2022 | Jagadeesan ............ G06V 10/98 |

OTHER PUBLICATIONS

El Kahi, Sabine, et al. "A vison-based system for mapping the inside of a pipe." 2011 IEEE International Conference on Robotics and Biomimetics. IEEE, 2011. (Year: 2011).*

Summan, Rahul, et al. "Image mosaicing for automated pipe scanning." AIP Conference Proceedings. vol. 1650. No. 1. American Institute of Physics, 2015. (Year: 2015).*

Yoshimoto Kayo et al: 11 Evaluation of endoscopic entire 3D image acquisition of the digestive tract using a stereo endoscope, Progress in Biomedical Optics and Imaging, SPIE—International Society for Optical Engineering, Bellingham, WA, US, vol. 10054, Feb. 14, 2017 (Feb. 14, 2017), pp. 1005412-1005412.

Kagami Sho et al: 113D Pipe Network Reconstruction Based on Structure from Motion with Incremental Conic Shape Detection and Cylindrical Constraint 11 , 2020 IEEE 29th International Symposium on Industrial Electronics (ISIE), IEEE, Jun. 17, 2020 (Jun. 17, 2020), pp. 1345-1352.

Johannes K\11 Unzel et al: 11 Automatic Analysis of Sewer Pipes Based on Unrolled Monocular Fisheye Images11, arxiv.org, Cornell University Library, 201 Olin Library Cornell University Ithaca, NY 14853, Dec. 11, 2019 (Dec. 11, 2019).

* cited by examiner

INSPECTION METHODS FOR SMALL BORE PIPES

CROSS-REFERENCE DATA

This US application is a continuation-in-part of the PCT Application No. WO2022172048 filed 15 Feb. 2021 with the same title, which is incorporated herein in its entirety by reference.

BACKGROUND

Without limiting the scope of the invention, its background is described in connection with the non-destructive inspection of pipelines. More particularly, the invention describes improved remote video inspection methods of image processing obtained using a conventional small-diameter videoscope to present to the observer an accurate unwrapped combined image of the internal surface of a small bore pipe.

The use of pipe networks is common in several industries, including oil and gas, petrochemical, nuclear, and aerospace as some examples. Regular non-destructive examination and assessment of these pipes to ensure safe operation is common and often required by safety regulations. Other examples of pipe networks that require inspection include water pipes and drain pipes. Optical cameras are frequently used where human access is constrained—typically by hazardous conditions or small pipe diameters.

Traditional systems and methods for inspecting the pipes may include a video camera head mounted on a push-cable that is deployed along a pipe to display the interior of the pipe on a camera control unit or another video display. Such video camera heads are essential tools to visually inspect the interior of the pipes and to identify possible defects therein, for example, pipe cracks or breaks, corrosion, leakage, and/or other defects or blockages inside the pipe. Traditional pipe inspection systems, though useful, are limited to manually performed visual inspection and interpretation of the images of pipes by an operator. Existing lateral push-cable camera systems generally include analog cameras with poor image quality due to limitations in power and signal processing down a lengthy push-cable, where the camera head must be sufficiently small to fit into and navigate the bends and turns of commonly used pipe diameters.

The problem may be exacerbated further by a small diameter of the pipe, such as under 25 mm, as it may restrict the view of the camera and further limit the ability of the operator to identify possible defects therein.

The need, therefore, exists for improved pipe inspection methods in order to increase confidence in assessment results and more reliably identify problem areas inside a pipe network.

SUMMARY

Accordingly, it is an object of the present invention to overcome these and other drawbacks of the prior art by providing novel methods for enhanced visual inspection of pipes, and in particular of small bore pipelines and networks.

It is another object of the present invention to provide novel methods for remote visual inspection of pipes with improved image quality.

It is a further object of the present invention to provide novel methods of visual inspection adapted to operate with existing visual inspection equipment and yet provide improved image representation of interior surfaces of small bore pipes.

It is yet a further object of the present invention to provide improved methods for remote visual inspection using a small diameter handheld videoscope equipped with just the video camera and without additional sensors, laser projectors, pipe crawler mechanisms, or camera positioning and centering hardware.

It is yet another object of the present invention to provide novel visual inspection methods allowing to localize identified pipe defects with greater accuracy along the length of the pipe.

It is a further yet object of the present invention to provide novel visual inspection methods configured to compensate for the low light intensity of the raw images acquired by the videoscope.

The novel video inspection method for an interior surface of a pipe of the present invention may include the conventional steps of (a) defining the geometrical size and shape of the interior surface of the pipe, (b) providing a videoscope sized to fit inside the pipe, (c) advancing the videoscope through the pipe while acquiring raw images from the video camera of the videoscope. The method further includes the novel steps of (d) estimating the video camera pose for at least some of the raw images of step (c), (e) sequentially building a pipe point cloud, a mesh, and a 3D textured model of the interior surface of the pipe from the raw images with adjustments for video camera poses, (f) unwrapping the raw images using corresponding video camera poses and the pipe point cloud to create unwrapped images of the interior surface of the pipe, and (g) creating a panoramic image of the interior surface of the pipe by stitching the unwrapped images together.

The step of extracting and matching unique features of the images may be performed using pipe point clouds and Structure-from-Motion techniques as a basis. Beyond that, the method of the invention allows enhanced sharpness, reduced artifacts, and improved uniformity of lighting as a result of reduced model noise and removal of outliers as described in greater detail below.

The method of the invention may be implemented in a software product configured to perform the steps of the method. The software may be loaded on a suitable computer, tablet, smartphone, or another appropriate electronic device.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through the use of the accompanying drawings, in which:

DETAILED DESCRIPTION OF PREFERRED EMBODIMENTS OF THE INVENTION

Figure 1:
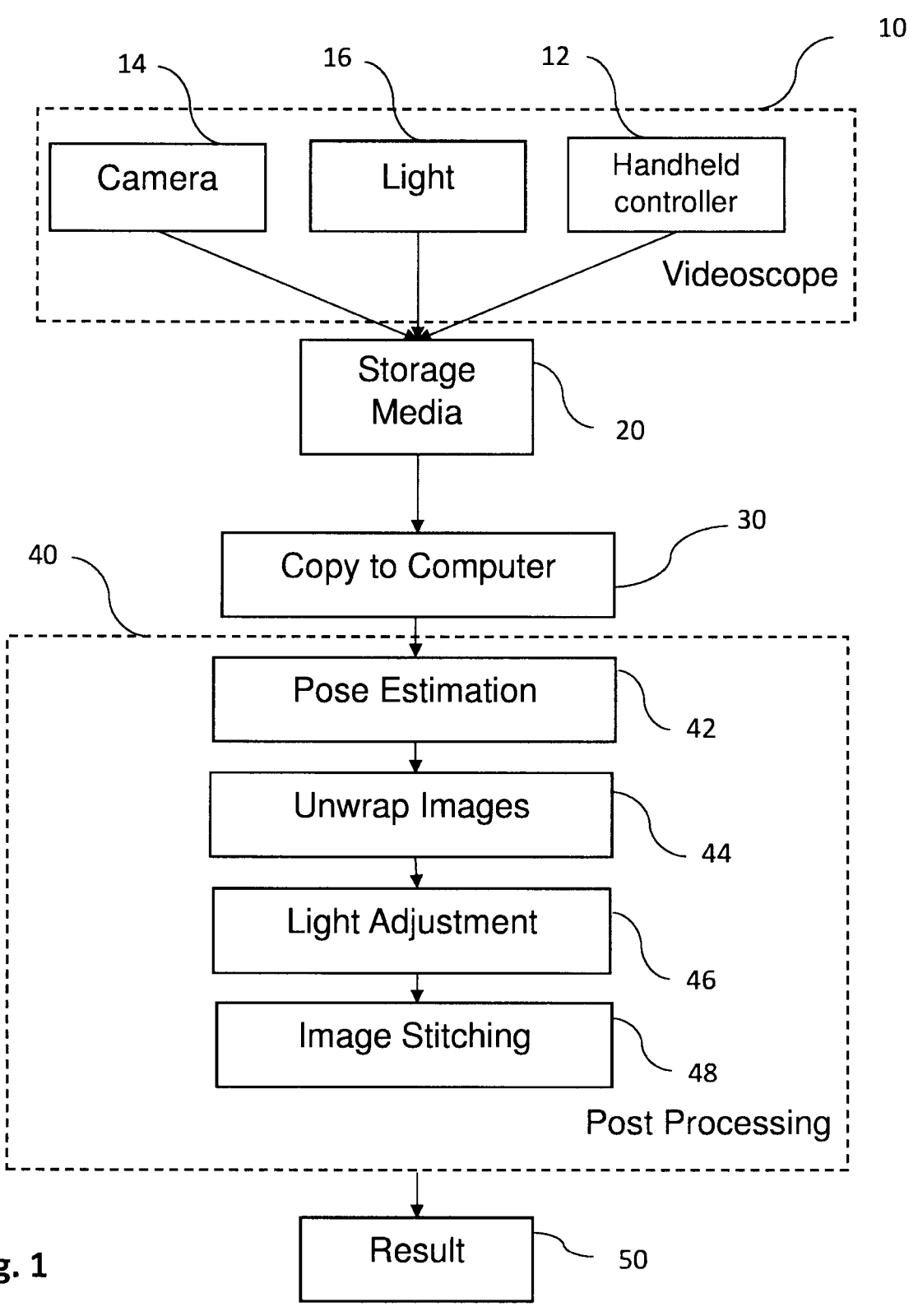
FIG. 1 is a block diagram of the components of the system to implement the present invention, listing major functional blocks thereof.

The following description sets forth various examples along with specific details to provide a thorough understanding of claimed subject matter. It will be understood by those skilled in the art, however, that claimed subject matter may be practiced without one or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

While the present invention may be useful for video inspection of a variety of internal surfaces of pipes, containers, canisters, reservoirs, and other cavities, it has a particularly advantageous utility in inspecting small-diameter pipes, such as 25 mm or smaller. This is because it only uses a feed of video or still images provided by a camera at the end of the scope, which may be obtained with additional lighting from an array of small-size LEDs. No other sensor, probe, or other hardware is required for applying the method of the invention, which makes the scope size as small as practical given the size of the suitable camera and light source.

FIG. 1 illustrates a general block diagram of the main components of the system implementing the present invention. A conventional videoscope 10 (shown in a dashed line) may include a handheld controller 12 with a flexible scope cable extending therefrom. A miniature camera 14 and a light source 16 (for example, an array of LEDs) may be mounted at the end of the flexible scope cable. The entire videoscope may be configured to provide raw video and still images as the scope is advanced throughout the internal space of a pipe under inspection.

Examples of suitable, commercially available videoscopes may include an Olympus IPLEX series of videoscopes (Olympus Corporation, Tokyo, Japan), which are only 2.4 mm in diameter, as well as a GE Video Borescope (General Electric, Boston, MA). Recent videoscope advances have produced even smaller size videoscope, such as only 1 mm in diameter, for example, a Super-ultra small industrial video borescope H NL-0.95CAM120 by SPI Engineering (Nagano, Japan), which is only 0.95 mm in diameter. Such small videoscopes are appropriate for evaluating pipes of smaller yet diameters, such as sub-millimeter pipes, using the methods of the present invention.

While commercially available videoscopes feature a small built-in display for directly observing the images supplied by the video camera, at least some also feature an option to store collected images using an internal or an external media storage element 20. Examples of a media storage element may include any suitable removable or embedded computer memory devices such as memory cards, sticks, tapes, etc., as the present invention is not limited in this regard. A further example of a media storage device 20 may include a plug-in cable configured to transmit the video images from the handheld videoscope 10 to any external computer 30, which itself may include a media storage element 20 built-in or removably attached thereto.

The method of the invention may be used to post-process the images obtained using the video camera either simultaneously with the process of advancing the videoscope along the pipe or at a later time using the recorded plurality of images, as the invention is not limited in this regard.

In either case, novel methods of the invention may be implemented as software loaded on a suitable electronic device 30 directly attached to or otherwise capable of receiving the successive images of the internal surface of the pipe from the videoscope 10, for example, via a memory stick file transfer. Examples of such suitable electronic computer devices 30 capable of operating the software to implement the methods of the invention may include a personal computer, a smartphone, a tablet, a laptop, a smartwatch, etc., as the present invention is not limited in this regard. In further embodiments of the invention, the images from the video camera 14 may be transmitted remotely (such as via the Internet) to a central server, which in this case may be configured to post-process the images, generate an unwrapped final result image and then transmit it back to the user or store in memory for subsequent review and further analysis. In this case, a suitable user interface, such as a suitable website configured for uploading the images to a central server, may be provided as part of the system of the present invention. Such remote post-processing of images is included in the scope of the notion of the computer 30 and post-processing unit 40, as illustrated in FIG. 1.

The post-processing unit 40 may include the following functional blocks: video camera pose estimation block 42, image unwrapping block 44, light adjustment block 46, and image stitching block 48, all of which are described below in greater detail. While in some embodiments, one or more of these blocks may be implemented as physically stand-alone units, in other embodiments, they may be implemented as elements of a single computer software product. In further yet embodiments of the invention, at least some of these functional blocks may be implemented as separate software programs configured to operate with each other or with other commercially available image-processing software products.

The output of the results of the post-processing transformation of the raw images obtained from the video camera 14 may be displayed for the observer in a functional block 50, which may be implemented as a computer monitor showing one or more of the unwrapped stitched images of the pipe interior surface. Alternatively, or in addition to a visual display, the results may be presented to the observer as a print-out or in other suitable graphically observable ways.

According to the present invention, a video inspection of an interior surface of a pipe may start with a step of defining the geometrical size and shape of the interior surface of the pipe. This may be accomplished by examining the pipe itself it is accessible or by inspecting the records of the pipe collected during its construction. The internal surface of the pipe may be defined as a 3D geometrical coordinate record of the axis of the pipe combined with a record of its cross-sectional area. Accurate knowledge of the interior geometry of the pipe, in some embodiments exceeding a sub-millimeter accuracy, may be instrumental in the proper fitting of the raw images obtained by the video camera to the actual dimensions defining the interior surface, as will be explained below in greater detail. A mathematical (or virtual) model of the interior surface of the pipe may then be created in order to define the boundaries of the surface, which naturally limits the field of view of the video camera during a pipe inspection.

Either before or after the step of obtaining the geometrical dimensions of the pipe interior surface, the actual video inspection may be carried out. It may include providing a videoscope equipped with a camera and a light source sized to fit inside the pipe. Advancing of the videoscope may be conducted while acquiring raw images from the video camera as discussed above. An optional step of observing the video feed from the camera may be instrumental in assuring the proper advancement of the videoscope and in identifying any gross defects of the pipe.

Once the record of a plurality of the raw images is obtained, a series of steps of the post-processing part of the process may be initiated. As a first step, a first, or preliminary determination of camera poses and point cloud may be created using a variety of techniques. One suitable technique for post-processing of the raw images is called Structure-from-Motion, or SfM. Generally speaking, SfM technique involves the recognition and extraction of unique features of successive images so that the geometrical relationship of successive images can be determined in the relationship of one image to the next. SfM technique allows the reconstruction of a 3D image from a series of 2D images recorded in a known succession.

As can be appreciated by those skilled in the art, the accuracy of the reconstructed 3D model highly depends on the quality of available 2D images. Low light intensity, for example, can reduce image quality, which may cause a reduction in the number of unique features available for reconstructing the 3D model. While videoscopes are equipped with an LED light source, such LEDs may not be able to completely cover the field of view of the camera or not provide bright enough illumination of the pipe interior.

These factors tend to introduce errors during the 3D reconstruction process and texture rendering, making the final result less than optimal for detecting pipe defects.

Figure 2:
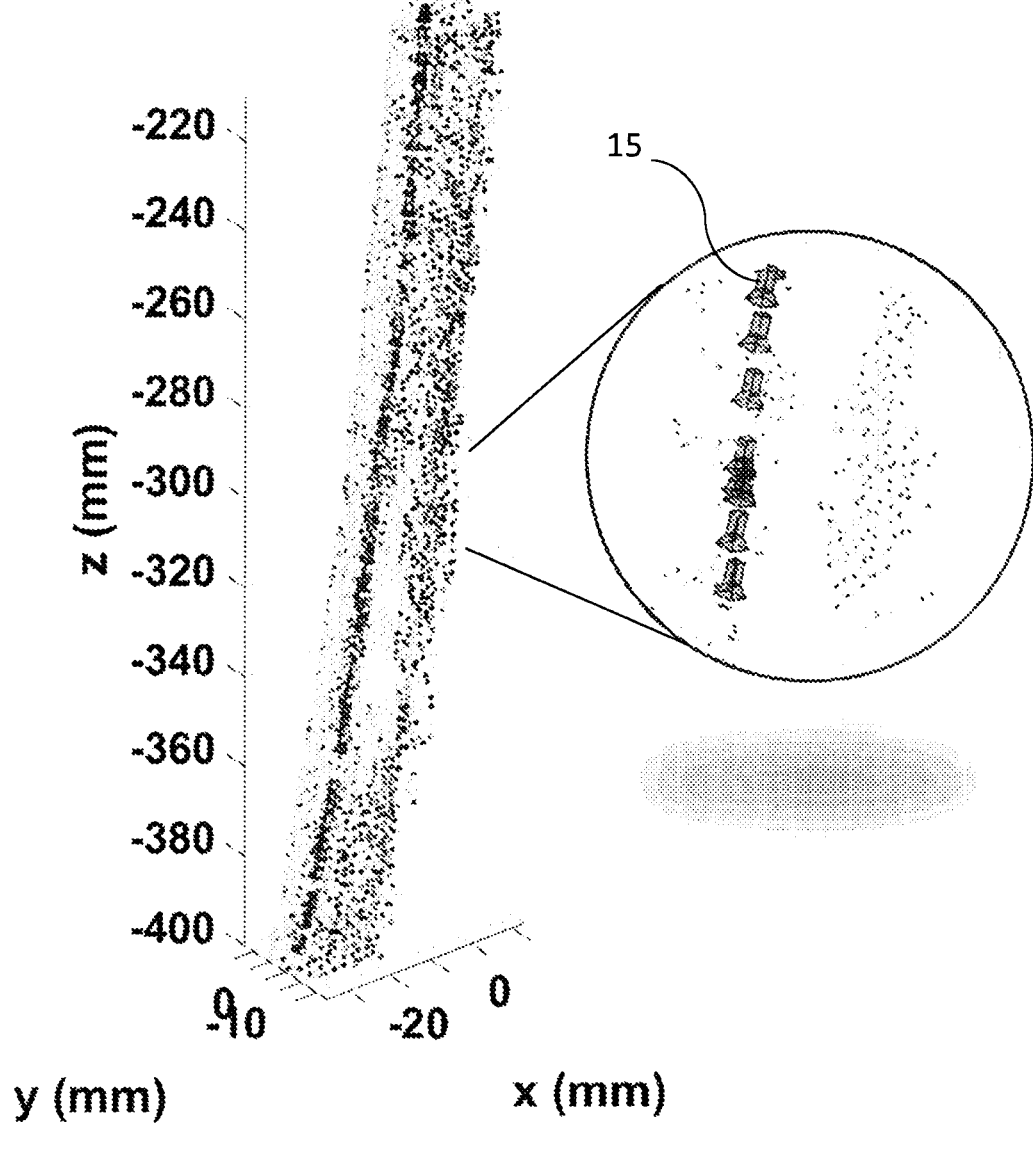
FIG. 2 is an example of point cloud and camera poses calculated therefore for an interior of a rectangular pipe.

FIG. 2 shows an example of a first, or preliminary 3D reconstruction of a rectangular pipe using a point cloud (shown as a plurality of raw points with varying density) and camera poses 15, as better seen in a circular zoom-in insert on the right of FIG. 2. An assumption is made that all images are captured by the same camera so the camera pose may be extracted from the images by matching these unique features between various raw images.

Each point is shown in varying degrees of black, with less color indicating fewer features extracted from the raw images, typically because of the blurs or low light density. As can be observed, the point cloud in this example contains many outliers, empty zones, discontinuities, and considerable noise, all of which may negatively impact the final result. Artificial discontinuities, for example, may create an impression of a defect in a place where there is no physical defect present. That may create a need for an unnecessary intervention and costly unnecessary repair.

Figure 3:
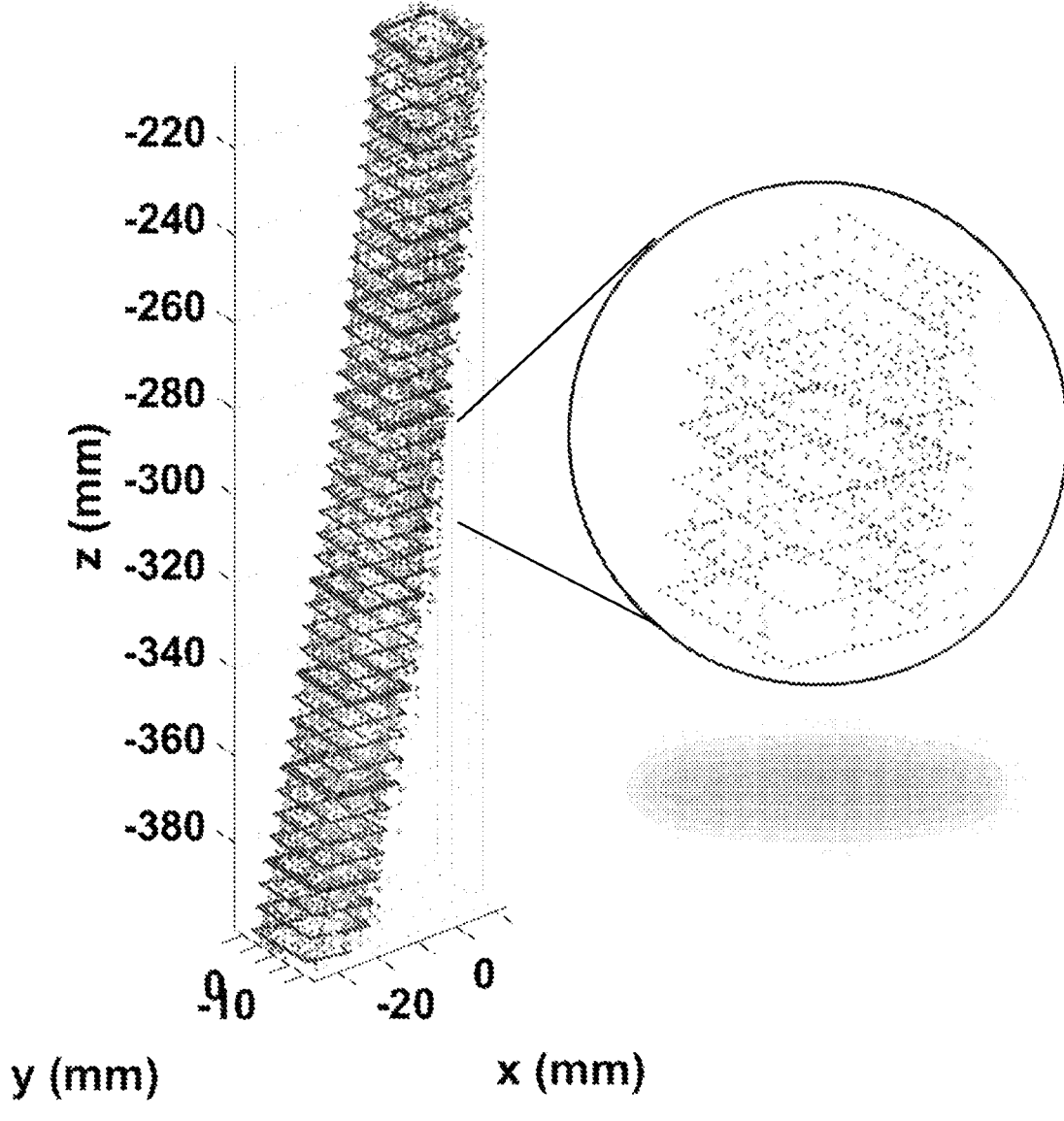
FIG. 3 is an example of a reconstructed 3D model fitted to a pipe with known geometry.

To improve on this preliminary 3D reconstruction, the present invention contemplates an additional step of fitting the preliminary first 3D reconstruction to a virtual model of a pipe created from the known pipe geometry and shape. In embodiments, the point cloud may be separated into individual slices in order to accommodate pipe bends and other complex geometry. The fitting procedure may be carried out by tuning the poses of the camera and fitted pipe slices, for example, with the goal of minimizing the average of the Euclidean distance between the fitted pipe and the corresponding preliminary point cloud slice. Using a virtual pipe model, the point cloud slices may be adjusted so as to fit the virtual pipe as a whole, as seen in FIG. 3, representing a second pipe point cloud. This step may be instrumental in reducing the noise of the images and compensating for empty or dark regions of the pipe, as can be appreciated from the description below.

Using a 3D textured model built as a result of implementing the steps described above, a step of image unwrapping may then be conducted. Image unwrapping is a term generally describing a projection of the points in the world coordinate to a 2D Cartesian coordinate. In this instance, a projection of the 3D textured model onto a 2D surface is conducted in order to create a final result of the inspection to be presented to the observer of the test.

Figure 4:
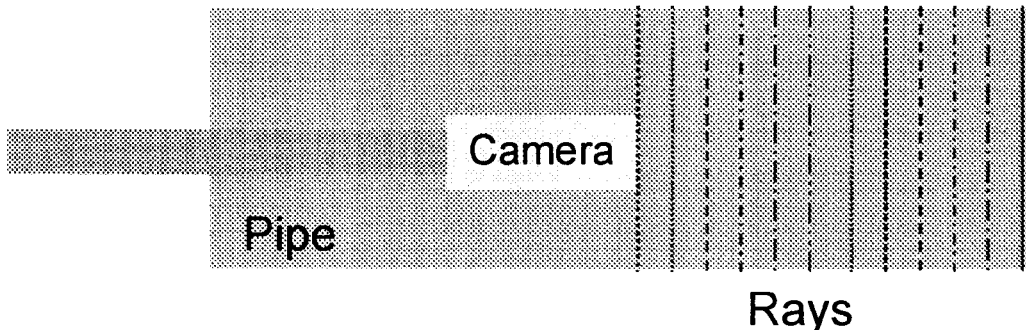
FIG. 4 illustrates the camera position and projected rays as part of image unwrapping.
Figure 5:
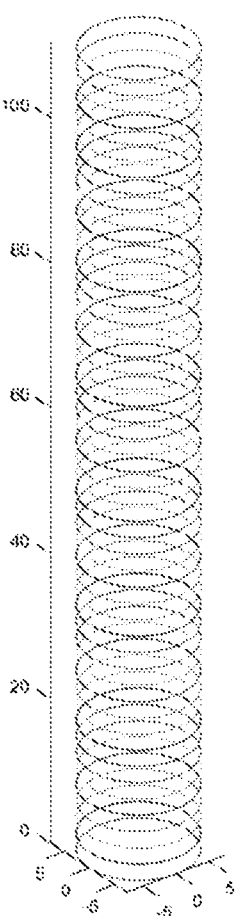
FIG. 5 shows an example of projected rays fitted to the geometry of an interior of a round pipe.
Figure 6:
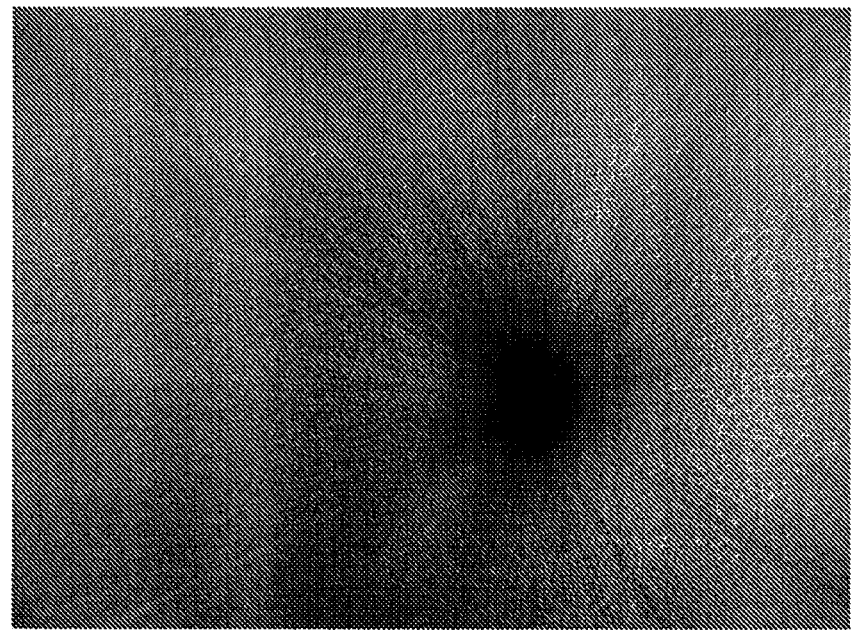
FIG. 6 shows an example of a raw image seen by a camera inside a round pipe.
Figure 7:
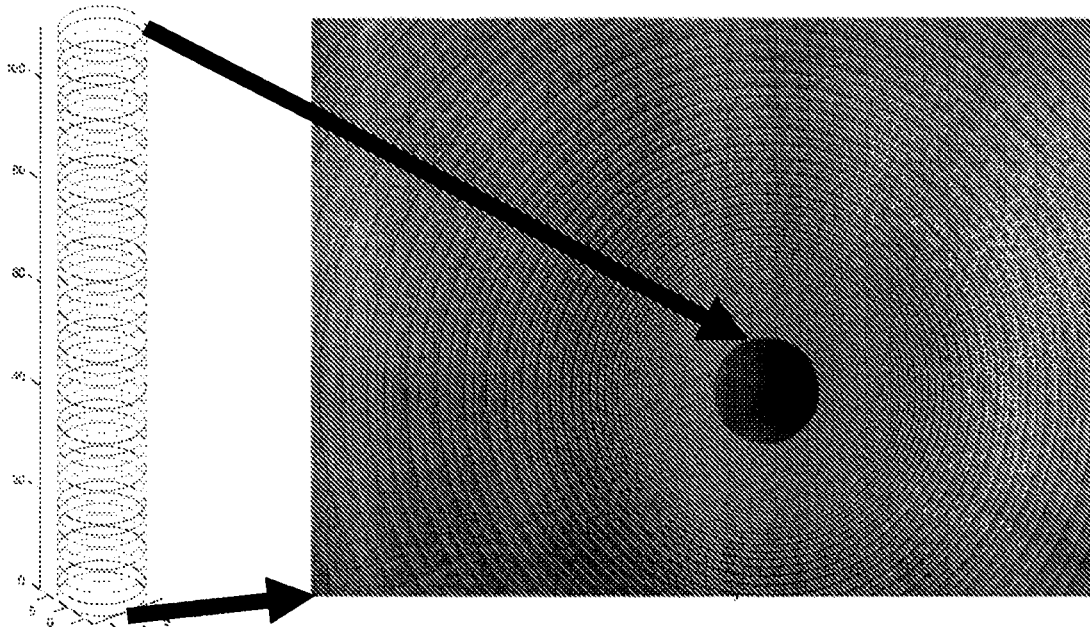
FIG. 7 shows a postprocessing step of fitting projected rays onto a raw image from FIG. 6.

One advantageous technique for inspection images unwrapping for the purposes of the present invention is depth-image-based-rendering and ray tracing. The unwrapping step may be initiated by creating an unwrapped image with multiple rays, as seen in FIG. 4. Shown in FIG. 4 is an example of a round pipe with a camera positioned along its central axis (after adjusting for camera poses as explained above based on the point cloud and initial camera pose) and a plurality of rays oriented across the pipe projected in front of the camera. These rays are projected onto a virtual model of the round pipe, as seen in FIG. 5. The correlated points of the rays may then be projected onto the raw 2D images, for example, see an image shown in FIG. 6 to create an image with ray projections as seen in FIG. 7.

A further advantageous step of the present invention includes lighting adjustment of the raw images, which can be carried out during the step of image unwrapping. Low light intensity and the nature of a small-size video camera may result in at least some portion of the acquired images containing blurry areas and distortions. Mixing these "featureless" parts with other sharper and more detailed parts of the image may reduce the quality and sharpness of the final result. The methods of the present invention use a weight factor assigned to at least some or even every pixel on each image in order to reduce the contribution of unfocused pixels and increase the contribution of pixels with high focus and sharpness.

Figure 8:
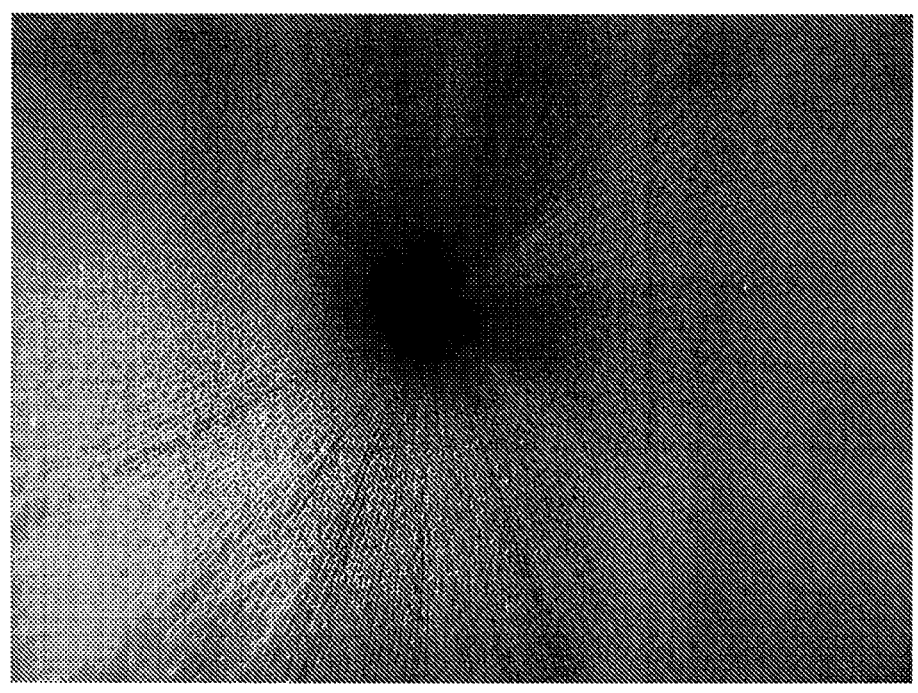
FIG. 8 is another example of a raw image seen by the camera inside a round pipe.
Figure 9:
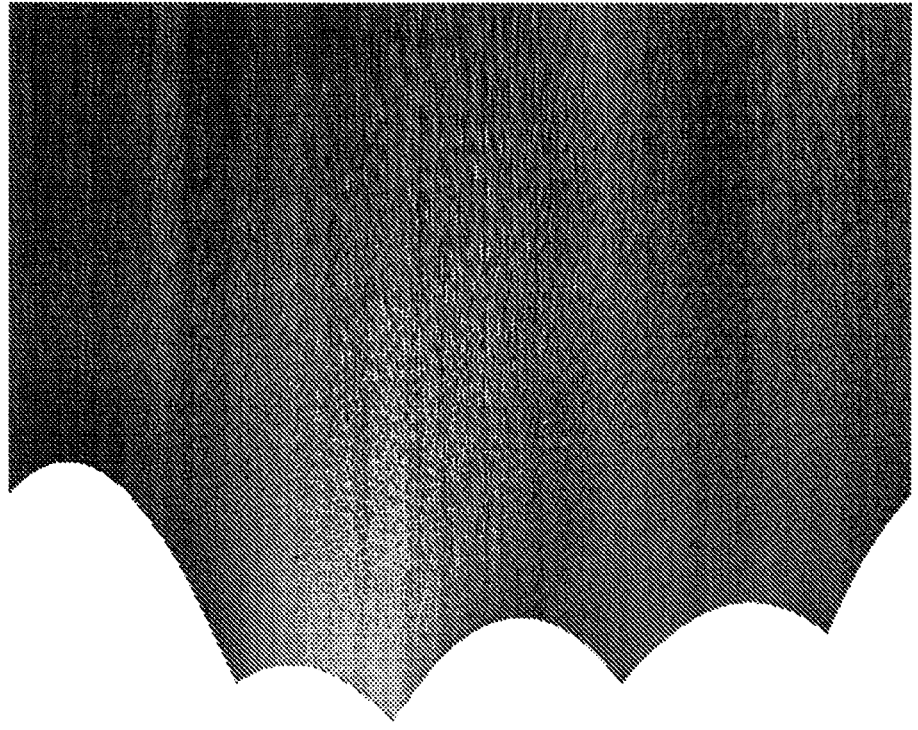
FIG. 9 is an example of an unwrapped image from that of FIG. 8.

In one example seen in FIG. 8, the raw image has points with maximum contribution close to the center of the image, while peripheral parts of the image have lower sharpness and therefore are assigned lower weight factors. A linear increase of sharpness from the periphery towards the center of the image may be assumed, and therefore, a corresponding linear increase in weight factors may be implemented before unwrapping the image. FIG. 9 shows an example of using weight factors in unwrapping the image of FIG. 8. A lower contribution is represented by higher transparency, up to the point of abandoning some of the image parts at the lower edge of the image. Abandoned parts of the image may be compensated by more sharp images of the same portion of the pipe obtained from other raw images so that blending of focused and unfocused pixels of the same portion of the image is avoided—resulting in an increased focus of the final result.

Figure 10:
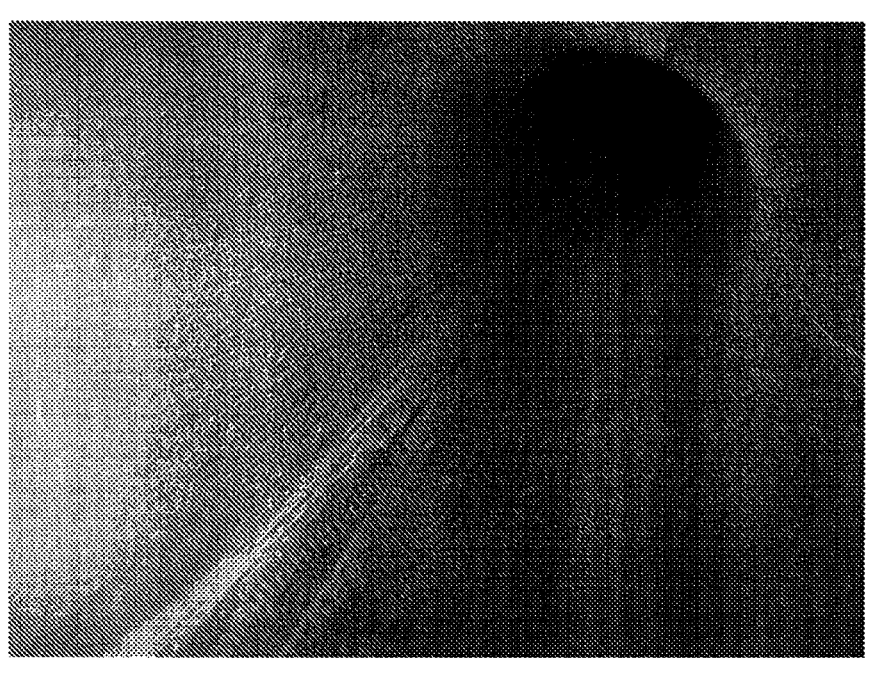
FIG. 10 is yet another example of a raw image from a camera positioned inside a round pipe.
Figure 11:
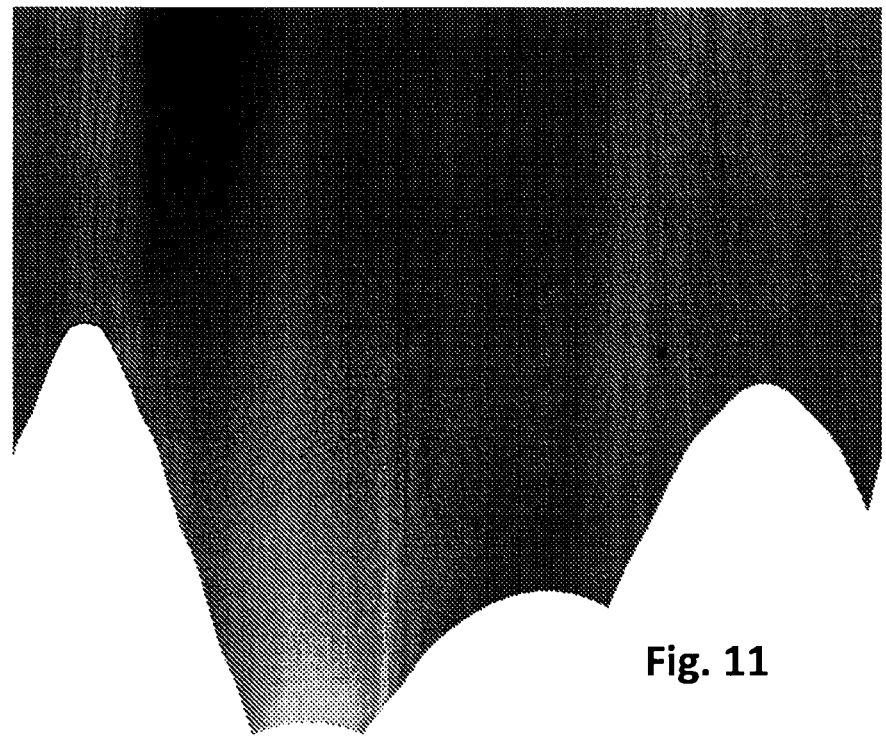
FIG. 11 is an example of unwrapping of the image of FIG. 10.

Another example of such image adjustment is seen in FIGS. 10 and 11. FIG. 10 shows the raw image of the pipe interior, while FIG. 11 shows an adjusted unwrapped image of the same, created using FIG. 10 as a starting point.

Figure 12:
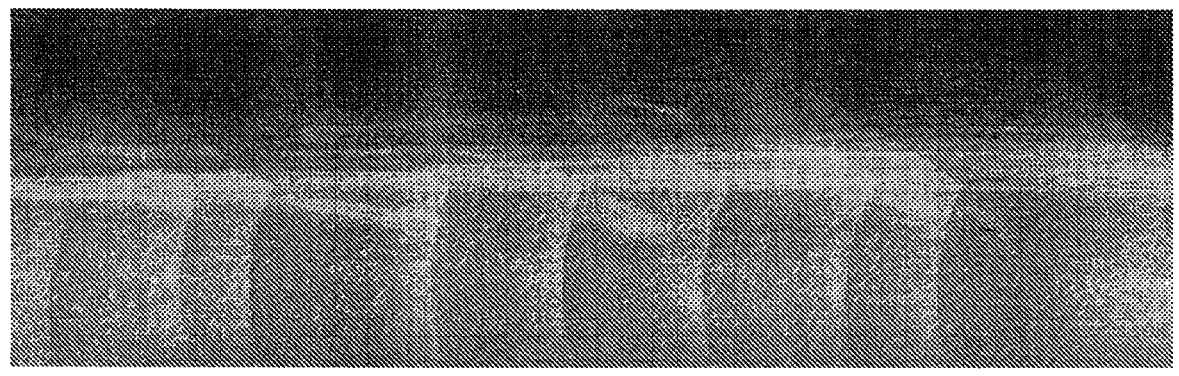
FIG. 12 is an example of manual image stitching using a plurality of unwrapped images.

Image stitching to create a panoramic combined image of the interior surface of the pipe may be the next step in the method of the invention. Traditionally, manually-conducted image stitching is a time-consuming process when it comes to consolidating a large number of images, which can easily go into hundreds or more images. In addition, variable lighting conditions may occur when different adjacent images are taken, due to movement of the video camera, light source repositioning, blind spots in illumination, and for other reasons. Variability in lighting may cause the occurrence of light artifacts in the final panoramic image, as can be seen in FIG. 12, for example. Abrupt transitions between well-lit and poorly lit areas of the pipe may create an erroneous impression of a presence of a defect in the pipe, which may not be there.

Figure 13:
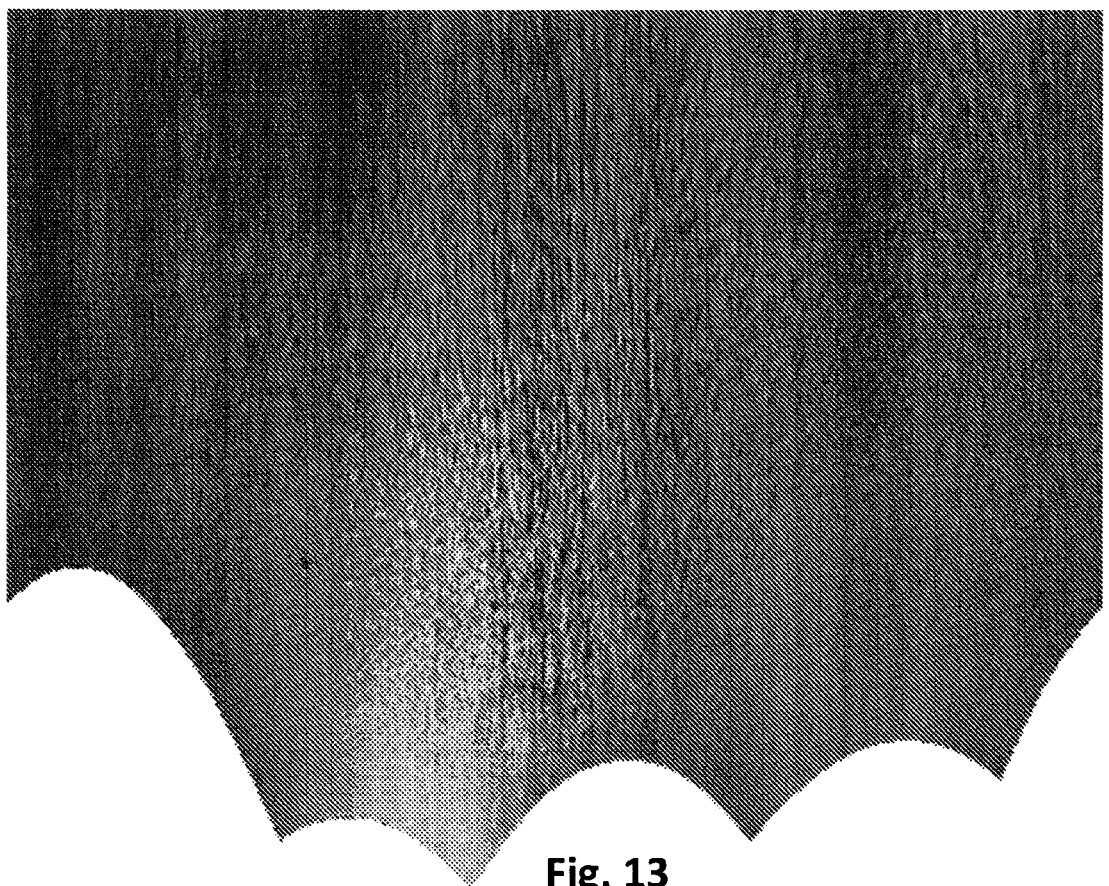
FIG. 13 is an example of an unwrapped raw image of the internal surface of a round pipe.
Figure 14:
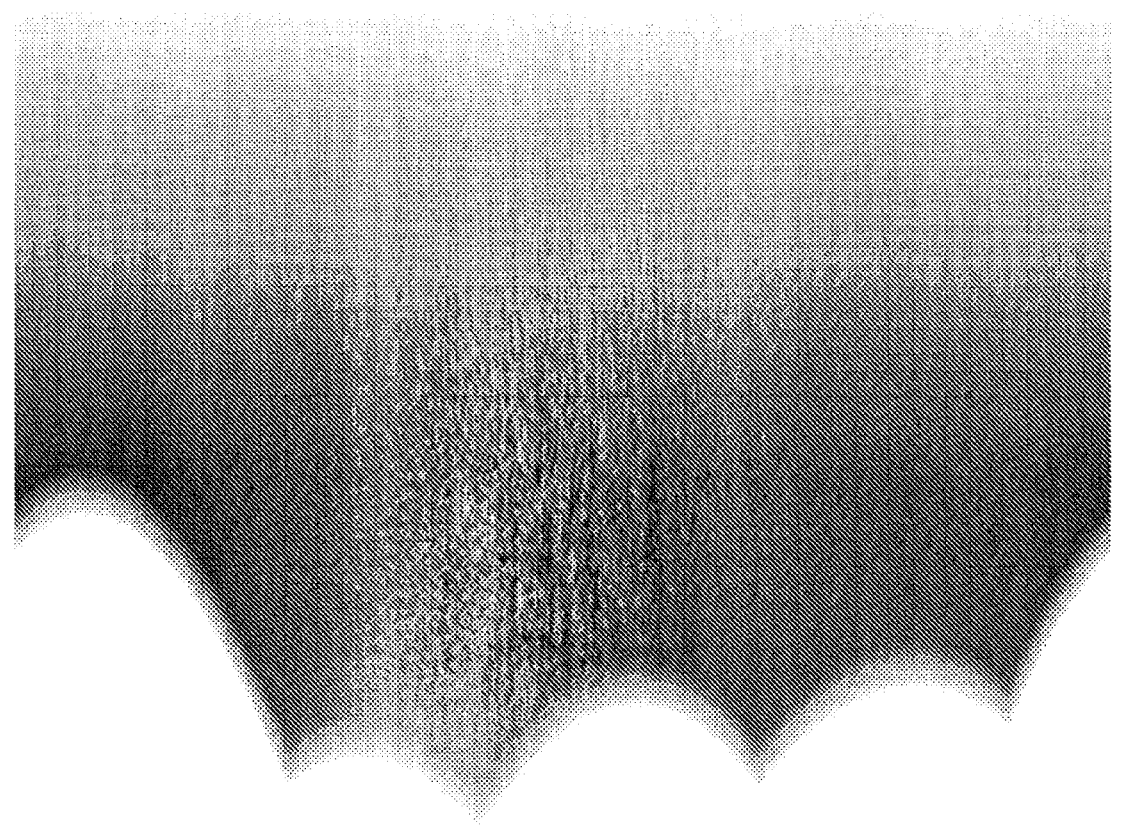
FIG. 14 is an example of a weighted image of FIG. 13 to adjust the lighting thereof.

The present invention addresses this problem by deploying a step of adjusting image brightness for at least some of the images of the pipe, as illustrated in FIGS. 13 and 14. FIG. 13 shows an example of a raw unwrapped image. The brightness of the image is a function of lighting, which is generally diminished from the center of the video camera (which is located generally at the same spot as the light source) towards the periphery of the image. Each image may be processed based on this or another suitable light distribution model. In one example, the video camera pose is estimated on the image, and a gradual decrease of brightness away from that point on the image is used to assign respective weight factors to at least some or all pixels of the image. The lower weight factor results in a more transparent result of the weighted image—as seen in FIG. 14 around the edges of the image.

Processing of at least some or all of the images for adjustment of the brightness before image stitching results in a more gradual final panoramic picture, thereby avoiding lighting artifacts and reducing the likelihood of identifying a false defect in the pipe—as seen from the examples described below.

Figure 15:
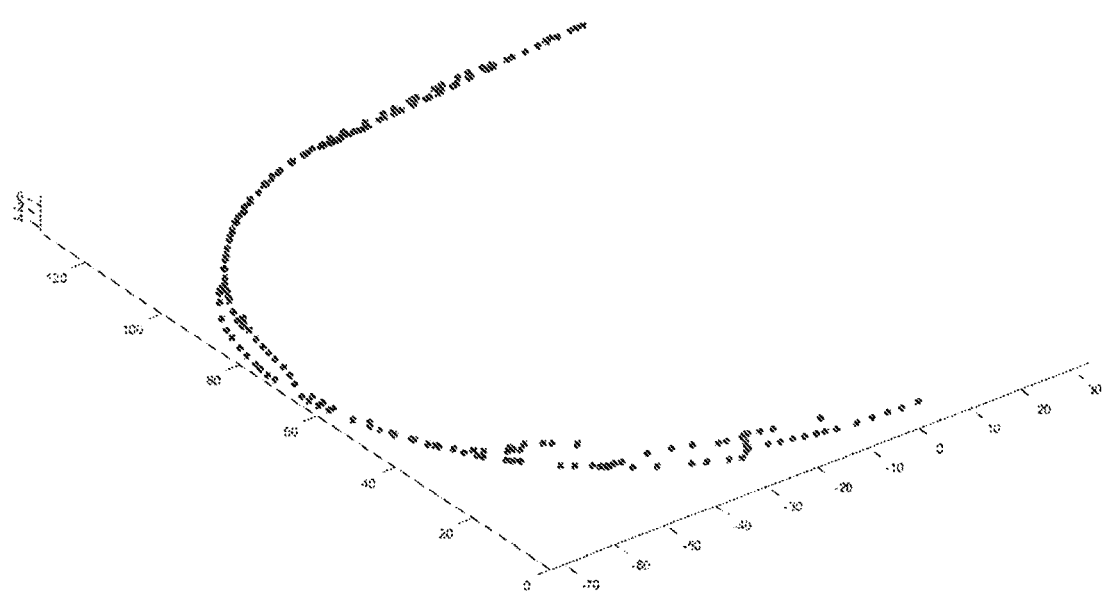
FIG. 15 is an illustration of using camera poses for automated image stitching.

FIG. 15 shows estimated poses of the video camera extracted from the point cloud during video inspection of a round pipe long a U-shaped curve of the pipe position.

Successive points indicate individual camera poses when the images of the interior surface of the pipe were taken. To stitch these images, each $N^{th}$ point may be assumed to represent a 0, 0, 0 initial coordinates. The entire point cloud may then be rotated using the rotation of the nearest fitted pipe section. The distance between two successive images N and N+1 may then be assumed to be the distance between these two points along the path of FIG. 15. Successive images of the pipe interior may then be automatically processed between corresponding poses and positions of the video camera.

Figure 16A:
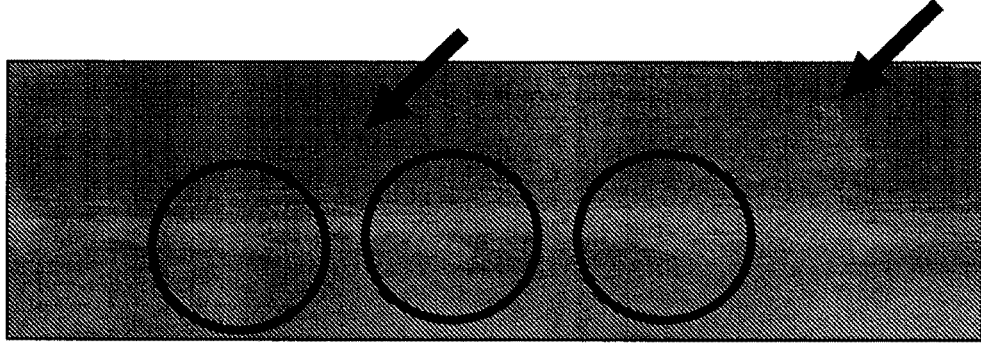
FIGS. 16*a* to 16*d* show examples of using Structure-from-Motion and image stitching to develop a smooth unwrapped image of the interior surface of the pipe.
Figure 16B:
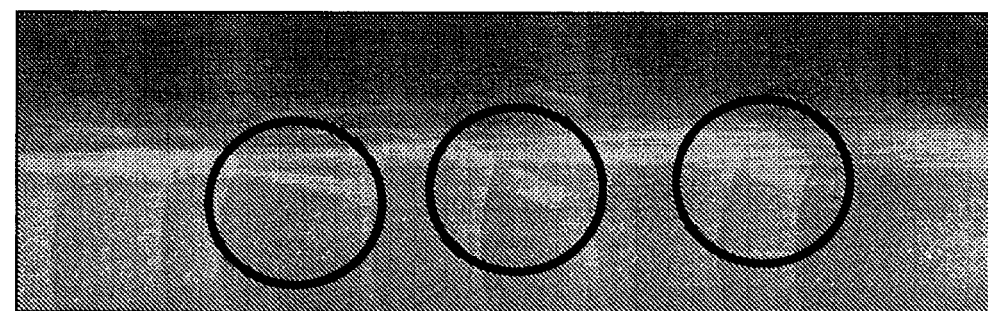
Figure 16C:
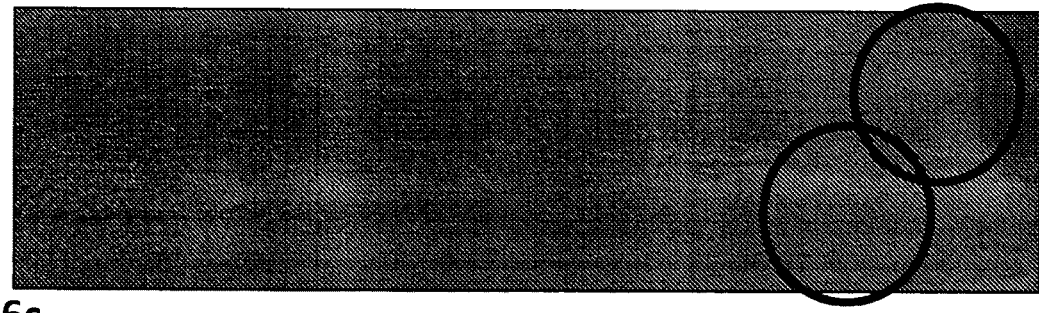
Figure 16D:
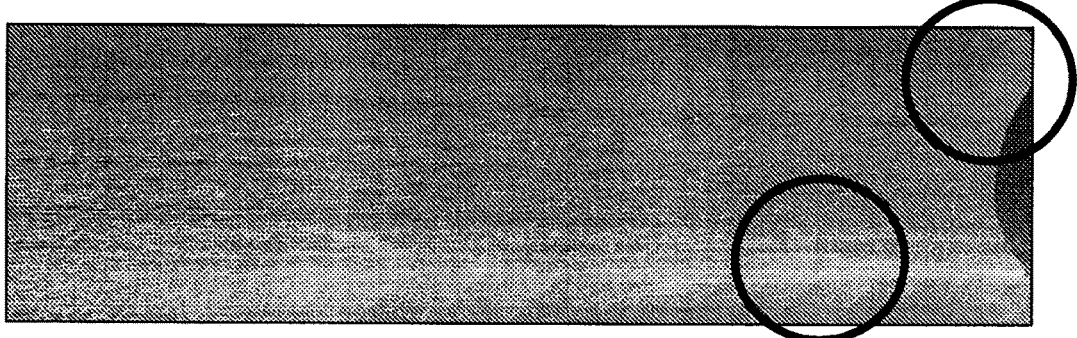

Finally, FIGS. 16*a* through 16*d* show a comparison of various methods of image stitching of the prior art (FIGS. 16*a*, 16*b*, 16*c*) against that obtained using the method of the present invention shown in FIG. 16*d*. A clean round copper pipe without any internal surface defects was used to obtain all of these images. FIG. 16*a* shows a panoramic image obtained from a plurality of individual images of the pipe interior with reconstruction errors on the mesh, which appear as defects, highlighted within the three circles and pointed by two arrows. These are artifacts of image processing and are not indicative of actual pipe defects.

FIG. 16*b* shows a panoramic image of the same pipe obtained by manual stitching of the images with variable brightness, indicating light artifacts as seen in the three circles.

FIG. 16*c* is a panoramic image of the same pipe obtained using SfM without weight adjustment of the images, thus producing defect-like artifacts seen within the two circles on the right.

FIG. 16*d* shows a panoramic combined image of the pipe obtained using the present invention with all the weighting and light adjustments as described above. This image has the most uniform lighting, best sharpness, and least artifacts as compared to all of the previous three images.

It is contemplated that any embodiment discussed in this specification can be implemented with respect to any method of the invention, and vice versa. It will also be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference. Incorporation by reference is limited such that no subject matter is incorporated that is contrary to the explicit disclosure herein, no claims included in the documents are incorporated by reference herein, and any definitions provided in the documents are not incorporated by reference herein unless expressly included herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic (s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12, 15, 20 or 25%.

All of the devices and/or methods disclosed and claimed herein can be made and executed without undue experimentation in light of the present disclosure. While the devices and methods of this invention have been described in terms of preferred embodiments, it will be apparent to those of skill in the art that variations may be applied to the devices and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A video inspection method for an interior surface of a pipe, the method comprising the steps of:
   a. defining geometrical size and shape of the interior surface of the pipe, wherein the pipe is a small bore pipe with an internal diameter or an internal size characterizing a cross-section of the pipe being 25 mm or smaller;
   b. providing a videoscope sized to fit inside the pipe, wherein the videoscope is equipped with only a video camera and illuminating lights, and does not include any camera centering hardware, laser projection hardware, or any other sensor;
   c. advancing the videoscope through the pipe while acquiring raw images from the video camera of the videoscope;
   d. estimating the video camera pose for at least some of the raw images of step (c) by extracting and matching unique features from consecutive raw images using a Structure-from-Motion (SfM) technique;
   e. sequentially building a pipe point cloud and a 3D textured model of the interior surface of the pipe from the raw images with adjustments for video camera poses, wherein building the pipe point cloud comprises:
   i. building a first point cloud from the raw images;
   ii. creating a virtual pipe using known pipe dimensions; and
   iii. building a second pipe point cloud by fitting the virtual pipe to the first point cloud by minimizing an average of Euclidean distances between the virtual pipe and the first pipe point cloud;
   followed by adjusting of image brightness based on a light distribution model and the video camera pose, wherein the light distribution model is that of a gradual decrease of lighting from a center of the video camera pose towards a periphery of the raw image;
   f. unwrapping the raw images from step (e) using corresponding video camera poses and the second pipe point cloud to create unwrapped images of the interior surface of the pipe, wherein the unwrapping is performed using Depth-Image-Based-Rendering (DIBR) and ray tracing techniques, and further comprises creating an unwrapped image with multiple rays projected onto the virtual pipe in front of the video camera based on a pose thereof and using the second pipe point cloud; and
   g. creating a panoramic image of the interior surface of the pipe by stitching the unwrapped images together, wherein creating the panoramic image comprises:
   i. assigning a weight factor to at least some of the pixels on at least some of the raw images by gradually increasing the weight factor for each pixel from the periphery of the raw image towards a center thereof, thereby creating unwrapped and weighted images; and
   ii. stitching the unwrapped and weighted images together with averaging of the pixels from related images with their respective calculated weight factors.

2. The method as in claim 1, wherein the point cloud is separated into individual slices in order to accommodate pipe bends, and the fitting procedure in step (e) (iii) is carried out by tuning the poses of the camera and fitted pipe slices.

3. The method as in claim 1, wherein the correlated points of the rays in step (f) are projected onto the raw 2D images to create images with ray projections.

4. The method as in claim 1, wherein the weight factor assigned in step (g) (i) is configured to reduce the contribution of unfocused pixels and increase the contribution of pixels with high focus and sharpness.

\* \* \* \* \*